US007975059B2

(12) United States Patent
Wang et al.

(10) Patent No.: US 7,975,059 B2
(45) Date of Patent: Jul. 5, 2011

(54) GENERIC APPLICATION LEVEL PROTOCOL ANALYZER

(75) Inventors: Jiahe Helen Wang, Issaquah, WA (US); Nikita Borisov, Champaign, IL (US); David J. Brumley, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 1434 days.

(21) Appl. No.: 11/274,488

(22) Filed: Nov. 15, 2005

(65) Prior Publication Data

US 2007/0112969 A1      May 17, 2007

(51) Int. Cl.
*G06F 15/16*      (2006.01)
*G06F 9/45*      (2006.01)

(52) U.S. Cl. .................... 709/230; 709/231; 717/143

(58) Field of Classification Search .......... 709/230–231; 717/143, 154
See application file for complete search history.

(56) References Cited

U.S. PATENT DOCUMENTS

| | | | |
|---|---|---|---|
| 6,549,937 B1* | 4/2003 | Auerbach et al. ............. | 709/206 |
| 6,662,360 B1* | 12/2003 | Hay et al. ..................... | 717/131 |
| 6,748,589 B1* | 6/2004 | Johnson et al. ............... | 717/150 |
| 6,819,655 B1* | 11/2004 | Gregson ........................ | 370/242 |
| 7,072,970 B2* | 7/2006 | Georgiou et al. ............. | 709/230 |
| 7,107,492 B2* | 9/2006 | Dassow et al. ................ | 714/39 |
| 2003/0005021 A1* | 1/2003 | Shah et al. ...................... | 709/1 |
| 2004/0194074 A1* | 9/2004 | Shibayama et al. ............ | 717/151 |
| 2009/0287725 A1* | 11/2009 | von Praun ...................... | 707/101 |

OTHER PUBLICATIONS

Wang, H., Guo, C., Simon, D., Zugenmaier, A.,"Shiled: vulnerability-driven network filters for preventing known vulnerability exploits", Proceedings of the 2004 conference on Aplications, technologies, architectures, and protocols for computer communicatios; pp. 193-204, 2004 [retreived from ACM Sep. 3, 2009].*

N. Borisov, D. J. Brumley, H. J. Wang, and C. Guo. Generic Application-Level Protocol Analyzer and its Language. Network and Distributed System Security Symposium, San Diego, CA, Feb. 2007. [retreived from Internet Sep. 3, 2009].*

Musial, M."On-Line Timed Protocol Trace Analysis Based on Uncertain State Descriptions"; IFIP Conference Proceedings; vol. 107 Proceedings of the IFIP TC6 WG6.1 Joint International Conference on Formal Description Techniques for Distributed Systems, pp. 337-352, year1997[retreived on Oct. 22, 2009 from "http://user.cs.tu-berlin.de/~musial/fsmpap.pdf"].*

(Continued)

*Primary Examiner* — Philip J Chea
*Assistant Examiner* — Lashanya R Nash
(74) *Attorney, Agent, or Firm* — Lee & Hayes, PLLC

(57) ABSTRACT

A generic application-level protocol analyzer (GAPA) is adaptable to model an application and its response to messages in different protocols, including multiple, layered protocols in a network context. One mode of a GAPA includes an analysis engine having a plurality of objects adaptable to model an application and its response to messages. The objects may include a session dispatching object, a state machine object, a message parsing object, a protocol layering object, and a handler object. The analysis engine may be used to evaluate real-time network streams or to evaluate recorded network traces. The GAPA is adapted to specific applications using a generic application-level protocol analyzer engine language (GAPAL). The GAPAL uses a high-level syntax similar to those in existing protocol specification descriptions. The GAPAL supports binary and text-based protocols. Using the GAPAL, objects are described without writing low-level code to model specific objects or specify message formats.

20 Claims, 11 Drawing Sheets

OTHER PUBLICATIONS

Bermingham, D. ; Zhen Liu ; Xiaojun Wang ; Bin Liu, "Field-Based Branch Prediction for Packet Processing Engines", Parallel and Distributed Systems (ICPADS), 2009 15th International Conference, Dec. 8-11, 2009.pp. 276-283 [retrieved on Sep. 11, 2010 from IEEE database].*

McCann,P., Chandra, S., "Packet types: abstract specification of network protocol messages";SIGCOMM '00 Proceedings of the conference on Applications, Technologies, Architectures, and Protocols for Computer Communication, vol. 30 Issue 4, Oct. 2000. [retrieved from ACM database on Mar. 20, 2011].*

* cited by examiner

```
            HTTP_message -> Request | Response;
            Response -> ResponseLine HeadersBody;
            HeadersBody -> Headers CRLF Body ;
1010        Body ->
1008           { if (chunked) {
1012               body := ChunkedBody;
1014           } else {
                   body := NormalBody;                    1016
               } body:?;
1002        NormalBody -> data:byte[content_length]      1004
            Headers -> GeneralHeader Headers | ;
1020        GeneralHeader -> name:"[A-Za-z0-9-]+"
                       ":" value:"[^\r\n]*" CRLF
               { // == is for string comparison
                   if (name == "Content-Length") {
                       // convert value to base 10
                       content_length = strtol(value,10);
                   }
                   ...
               };
            ChunkedBody -> ... ;
```

*FIGURE 10*

```
/* bind header */
typedef struct {
    /* common header */
    u_int8 rpc_vers = 5;
    u_int8 rpc_vers_minor;
    /* bind iff PTYPE == 11 */
    u_int8 PTYPE;
    u_int8 pfc_flags;
    byte   packed_drep[4];
    u_int16 frag_length;
    u_int16 auth_length;
    u_int32 call_id;
    /* end common fields */ u_int16 max_xmit_frag;
    u_int16 max_recv_frag;
    u_int32 assoc_group_id;

/* var-size presentation context list */
    p_cont_list_t p_context_elem;
    /* optional authentication verifier */
    /* following field present iff auth_length!=0 */
    auth_verifier_co_t auth_verifier;
} rpcconn_bind_hdr_t;

typedef struct {
    u_int8  n_context_elem;
    u_int8  reserved;
    u_short reserved2;
    p_cont_elem_t [size_is(n_cont_elem)] p_cont_elem [];
} p_cont_list_t;

typedef struct { .... } p_cont_elem_t;

typedef struct { .... } auth_verifier_co_t;
```

```
int m_auth_len;

commonRPCHeaders ->
    rpc_vers:uint8
    rpc_vers_minor:uint8
    PTYPE:uint8
    pfc_flags:uint8
    packed_drep:byte[4]
    frag_length:uint16
    auth_length:uint16 {
        m_auth_len = auth_length;
    }
    call_id:uint32;

rpcconn_bind_hdr_t ->
    commonRPCHeaders
    max_xmit_frag:uint16
    max_recv_frag:uint16
    assoc_group_id:uint32
    p_context_elem:p_cont_list_t {
        if (m_auth_len !=0)
            auth_verifier := auth_verifier_co_t;
        else
            auth_verifier := emptyRule;
    }
    auth_verifier:?;

emptyRule -> ;

p_cont_list_t ->
    n_context_elem:uint8
    reserved:uint8
    reserved2:uint16
    p_cont_elem:p_cont_elem_t[n_context_elem];

auth_verifier_co_t -> .... ;
p_cont_elem_t -> .... ;
```

GENERIC APPLICATION LEVEL PROTOCOL ANALYZER

BACKGROUND

The use of networked computer systems in e-commerce, distributed data processing, and many other areas is constantly growing. Valuable data, ranging from confidential information to countless financial transactions, are constantly passed over networks. Unfortunately, as the importance of networked transactions increases, so do the associated risks. As networks and networked systems expand, so do the possibilities for both random errors and damage wrought by hackers, thieves, and spies. Accordingly, it is important for networked systems to have effective intrusion detection systems, firewalls, network monitors, and other systems to help preserve data security and integrity.

Application-level protocol analyzers are becoming increasingly important components of network security and integrity systems. Application-level protocol analyzers monitor communications to an application in real time or analyze recorded traces of network communications to construct the protocol context of communication sessions. Because it may not be possible to determine from the content of message whether it represents normal or malicious traffic, protocol analyzers assess the message content and context. Protocol analyzers translate a datastream into messages, group them into sessions, and model state transitions in a protocol state machine to evaluate whether a particular message presents a problem.

The protocol context for an application can be conceived as a particular path or traversal of the states the application can be anticipated to assume based on communications received over a network. Thus, the application states can be represented by a state machine, and a protocol context constitutes a path through the state machine, as illustrated in FIG. 1.

FIG. 1 illustrates a state machine 100 for a simple application. The application represented by the state machine 100 transitions from one state to another as a result of messages received over a network and how they are processed by message handlers. More specifically, FIG. 1 shows an exemplary protocol context 102, represented by a dotted line, representing a response of the application represented by the state machine 100 as a result of receiving various messages and how the messages are processed by a number of handlers.

The protocol context 102 begins at an initial state, WaitingforMsg1 104. Upon arrival of Msg1 106, the context 102 progresses to Msg1_Handler 108 to process the message. The content of the Msg1 106 will determine whether the Msg1_Handler 108 causes the system to transition to either a WaitforMsg2 state 110 or a WaitforMsg3 state 116. As indicated by the protocol context 102, based on the content of the Msg1 106, the Msg1_Handler causes the system to transition to the WaitforMsg2 state 110.

When a Msg2 112 is received, a Msg2_Handler 114 processes the Msg2 112 and causes the system to transition back to the WaitingforMsg1 state 104. Once back at the WaitingforMsg1 state 104, another Msg1 106 is received. Based on the content of the Msg1 106, the Msg1_Handler 108 this time causes the system to transition to the WaitforMsg3 state 116. While in the WaitforMsg3 state 116, a Msg3 118 is received. A Msg3_Handler 116 processes Msg3 118, resulting in the system transitioning to a Final state 122, where the protocol context 102 ends.

The exemplary protocol context 102 illustrated in FIG. 1 is a simple example, in a system having only three message types, three handlers, four states, and a few possible different state transitions based on the messages and responses of the handlers to those messages. As is well understood, modeling an application may involve a large number of message types, states, handlers, and transitions. Thus, developing a protocol analyzer capable of monitoring numerous message types, states, handlers, and transitions may prove very difficult.

Further complicating the process of protocol context analysis is the fact that many communications involve layers of protocols. A message of one protocol type may be transmitted in a datastream of another protocol. For example, remote procedure call (RPC) messages may be included within one or more hypertext transfer protocol (HTTP) messages, as shown in FIG. 2.

FIG. 2 illustrates the layers of messages an application-level RPC over HTTP protocol analyzer 200 will confront in attempting to monitor data communications in an RPC over HTTP system. The protocol analyzer 200 monitors communications in a datastream 202, which includes RPC messages that eventually will be passed to an RPC session 204. Because the RPC messages are transmitted in RPC over HTTP system, every type of message will involve two layers of message types, states, handlers, and transitions. To illustrate a few, examples, each RPC request 210 will be encompassed in an HTTP request 212. Similarly, an RPC acknowledgement 220 will be encompassed within an HTTP reply 222, and an RPC bind 230 will be included within another HTTP request 232. Because attacks on the system receiving the datastream 202 may be made at various points either at the HTTP or RPC levels, both protocols should be monitored to protect data security and data integrity.

Conventionally, to create an application-level protocol analyzer, one has to create a protocol analysis program ad hoc. Generally, a low-level programming language is used to create the protocol analyzer, because of the precise logical determinations and operations that will be involved in parsing and processing the messages received. In the case of layered protocols, as described in relation to FIG. 2, application-level protocol analyzers must be written to track both protocols to maintain data security and integrity at both protocols. Unfortunately, this can be a very complicated process, as described in connection with FIG. 3.

FIG. 3 diagrams a conventional process 300 for creating an application-level protocol analyzer. For the application for which the protocol analyzer is to be created, at 302, a next protocol for which messages will be analyzed for the application is identified. At 304, it is determined if a detailed specification exists describing how the application it responds to messages of the identified protocol and other events. This is a nontrivial aspect of the process, for there may not be a readily-available, sufficiently detailed specification from which a protocol analyzer can be created for the application. If it is determined at 304 that there is not an adequate specification for how the application responds to messages of the identified protocol, at 306, the specification is written.

Once a specification has been found or created, at 308, the code for the protocol analyzer is written. Thus, if no specification exists for the protocol, creating a protocol analyzer involves creating a specification, then writing a program to create the protocol analyzer. Protocol analyzers generally are developed using a general purpose, low-level programming language such as C. Creating the protocol analyzer usually requires understanding a large body of source code and writing thousands of lines of code. In addition, once the code is created at 308, at 310, the protocol analyzer is subjected to comprehensive testing to ensure that the code is free of errors and correctly models the response of the system to messages as indicated in the specification. Thus, the development and testing of a protocol analyzer is a demanding software development challenge.

Moreover, as described in connection with FIG. 2, an application may communicate using multiple protocols. Thus, at 312, it is determined if the application will receive and respond to messages in additional protocols. If so, the process 300 loops to 302 to identify the next protocol for which messages will be analyzed for the application. Once the protocol is identified, creation of the next protocol analyzer may involve writing an additional specification at 306 to detail how an application responds to messages of this next protocol, writing additional protocol analyzer code at 308, and further testing at 310. Once a protocol analyzer accounts for how an application responds to messages of the anticipated protocols has been created and tested, at 314, the protocol analyzer finally may be implemented.

In addition to the potentially burdensome process 300 illustrated by FIG. 3, there are additional concerns facing those that desire to create protocol analyzers. First, the labors of the process 300 to create a protocol analyzer may have to be independently borne for each application for which protocol analysis is desired. The ad hoc program used to create a protocol analyzer for one application may be difficult or impossible to adapt to another application, thus each application may involve creation of an entirely separate protocol analyzer. Second, available tools to simplify the process of creating protocol analyzers generally are only suited to processing binary protocols, and provide no help in developing a protocol analyzer to analyze text-based protocols.

SUMMARY

A generic application-level protocol analyzer (GAPA) is adaptable to model an application and its response to messages in different protocols, including multiple, layered protocols in a network context. One mode of a GAPA includes an analysis engine having a plurality of objects adaptable to model an application and its response to messages. The objects may include a session dispatching object, a state machine object, a message parsing object, a protocol layering object, and a handler object. The analysis engine may be used to evaluate real-time network streams or to evaluate recorded network traces. The GAPA is adapted to specific applications using a generic application-level protocol analyzer engine language (GAPAL). The GAPAL uses a high-level syntax similar to those in existing protocol specification descriptions. The GAPAL supports binary and text-based protocols. Using the GAPAL, objects are described without writing low-level code to model specific objects or specify message formats.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number and the two left-most digits of a four-digit reference number identify the figure in which the reference number first appears. The use of the same reference numbers in different figures indicates similar or identical items.

FIG. 10 is a segment of a GAPAL program.

FIG. 11 (Prior Art) is a specification of how an application responds to messages of a particular protocol.

FIG. 12 is a segment of a GAPAL program adapted from the specification of FIG. 11.

DETAILED DESCRIPTION

An embodiment of a generic, application-level protocol analyzer (GAPA) includes two components. First, the GAPA includes an analysis engine capable of evaluating messages according to various protocols, including parsing messages, evaluating session variables, tracking states, and monitoring handler activity included within the protocol, is provided. Second, the GAPA includes a generic, application-level protocol analyzer language (GAPAL), a protocol specification language used to direct the analysis engine to model applications.

Using embodiments of a GAPA, instead of writing ad hoc protocol analyzers in low-level programming languages, a user generates a protocol analyzer by adapting an analysis engine using the GAPAL. In one mode, the GAPAL employs a high-level syntax, such as a Backus-Nauer Form (BNF) grammar. The GAPAL can be used to describe both binary and text-based protocols, thus the analysis engine can be used for analysis of both types of protocols. The GAPA supports layered protocols, thus facilitating protocol analysis of multiple protocols. Multiple protocols may be analyzed by separate analysis engine instances, each of which is adapted to analyze a protocol and communicate with other instances using the high-level syntax provided by the GAPAL. Further, using the GAPAL, computations based on previous fields can be parsed to allow for comprehensive substantive analysis of each protocol. Moreover, a "visitor syntax" allows for message parsing logic to be maintained separately from protocol analysis logic in the GAPA, further simplifying the creation and revision of protocol analyzers.

Development of a Protocol Analyzer Using the GAPA

Figure 3:
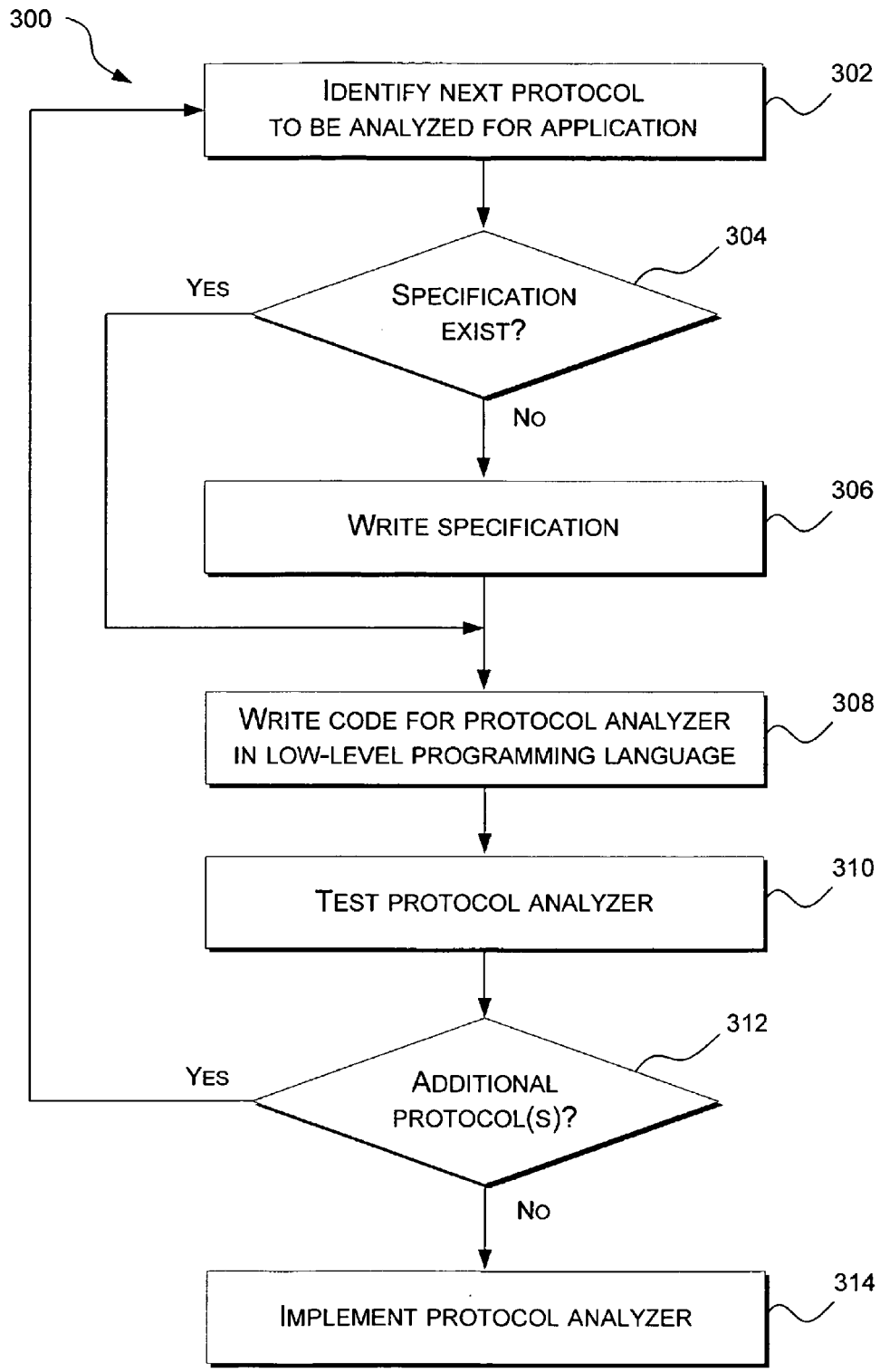
FIG. 3 (Prior Art) is a flow diagram illustrating a conventional process for creating a protocol analyzer in an environment potentially involving multiple layered protocols.

As previously described with regard to FIG. 3, developing a conventional protocol analyzer involves many rigorous, time-consuming processes, including developing one or more specifications, coding the protocol analyzer in a low-level language, and testing the protocol analyzer. Embodiments of the GAPA simplify the development of protocol analyzers.

Figure 4:
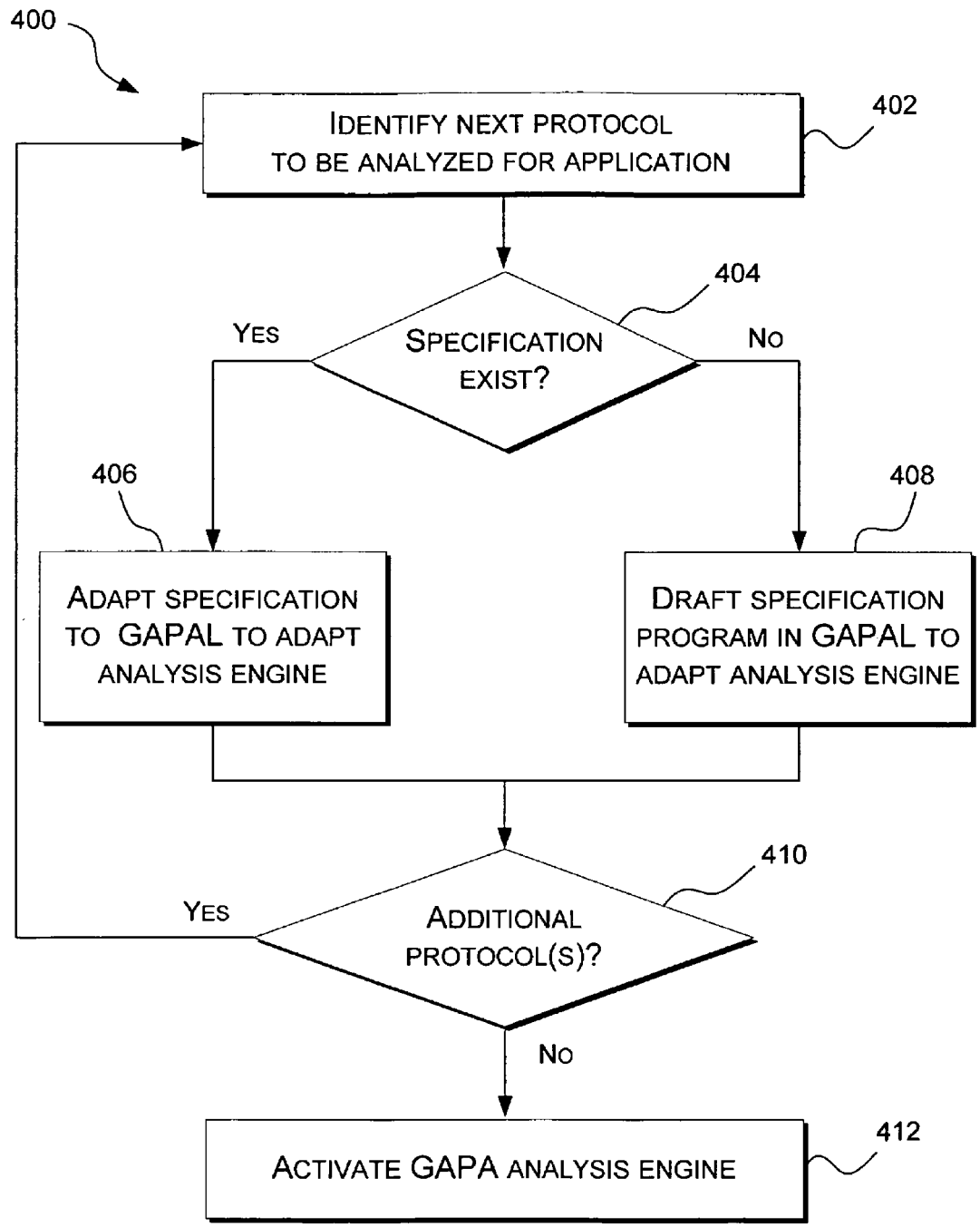
FIG. 4 is a flow diagram illustrating a process for customizing a generic application-level protocol analyzer (GAPA) using a generic application-level protocol language (GAPAL).

FIG. 4 shows a process 400 for adapting an embodiment of a GAPA to create one or more protocol analyzers. For the application for which the protocol analyzer is to be created, at 402, the next protocol for which messages are to be analyzed is identified. At 404, it is determined if a specification exists for the application. In addition to describing how the application responds to events, it is particularly significant whether the specification describes how the application responds to messages in the identified protocol.

If it is determined at 404 that an adequate specification for the application does exists, because the GAPAL is a protocol specification language that employs a high-level, BNF-type syntax, at 406, the specification can be adapted to create a GAPAL program, as is described further below. On the other hand, if it is determined at 404 that no specification exists, at 408, in a single operation, a specification is created using the GAPAL syntax, which, in and of itself, constitutes a program able that to direct the analysis engine.

By contrast, in the conventional process 300 (FIG. 3) if no specification is found to exist at 304, a specification would be created at 306 to provide a basis for the creation an ad hoc program in a low-level language to create the protocol analyzer at 308. Even if a specification is found to exist at 304, the ad hoc low-level program still would be created at 308. On the other hand, using embodiments of the GAPA, a protocol specification can be adapted into a GAPAL program, without coding an ad hoc low-level program. Alternatively, if no specification exists, the GAPAL is used to draft a "specification program" without both a specification and a program having to be written.

Referring to FIG. 4, at 410, it is determined if the application analyzer will receive and respond to messages in additional protocols that will be analyzed by the protocol analyzer. If so, the process 400 loops to 402 to identify the next protocol. On the other hand, if it is determined at 410 that no additional protocols are to be analyzed, at 412, the GAPA analysis engine is activated to perform protocol context analysis.

Architecture of a GAPA Protocol Analysis Engine

Figure 5:
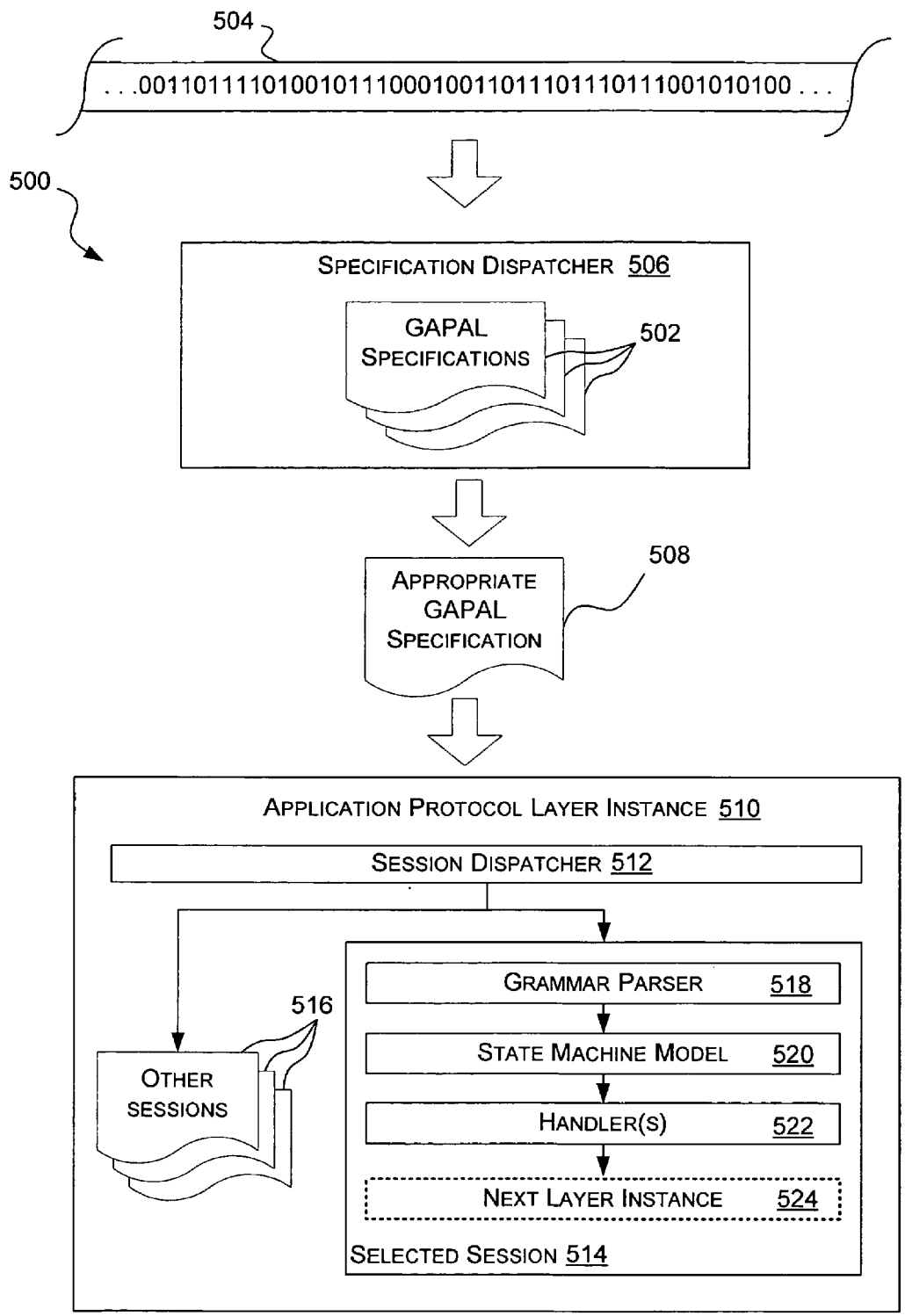
FIG. 5 is a block diagram of an embodiment of an analysis engine of the GAPA.

FIG. 5 illustrates in block diagram form an architecture of an analysis engine 500 according to an embodiment of a protocol analyzer. The analysis engine 500 uses a set of previously created GAPAL specifications 502 to analyze packets received from a datastream 504. The creation of the GAPAL specifications 502 is described in further detail below. The GAPAL specifications describe the session variables, grammars, state machines, session identifiers, and handlers to direct operation of the analysis engine 500.

Embodiments of the protocol analysis engine 500 may operate in one of two modes: a normalizing mode or an analysis mode. In normalizing mode, the analysis engine 500 forwards potentially modified traffic to the application. Whether the traffic is forwarded to the application is based on actions of handlers included to respond to potentially malicious or otherwise troublesome communications. In analysis mode, the analysis engine 500 monitors traffic or evaluates network traces logs without potentially making modifications to the network data.

In one mode, the analysis engine 500 performs recursive descent parsing and generates a parse tree. Embodiments of a GAPA buffer only data that is needed for analysis to minimize the memory used by the analysis engine to improve performance or to avoid state-holding attacks that seek to interfere with system operations. Accordingly, only parts of the parse tree that are or will be used, incompletely parsed fields of a message, or packets that are about to be normalized are buffered to reduce the memory footprint of the analysis engine.

More specifically, parts of the parse tree referenced by handlers and that may be used later are stored, while the rest of the parse tree is discarded. More specifically, the portions of the parse tree to be maintained are identified at parse time by identifying variables in the parse tree that are referenced by the handlers, as determined by the handler interpreter. The portions of the parse tree relating to these variables are maintained, while the remainder of the parse tree is discarded to free the corresponding memory.

In further minimizing memory used for normalization, in one mode, the only normalization that occurs involves dropping a packet or a session based on an error. A packet is only buffered by the analysis engine 500 as long as its fields are being parsed by the grammar parser, and the packet is released to the application immediately afterwards. Thus, once a packet has been parsed, it is not stored by the analysis engine 500. Accordingly, the analysis engine 500 does not consume memory by accumulating packets that represent part of a continuing communication.

Because packets are released to the application before the entire message is received, potentially, some packets that constitute part of a malicious communication may be passed to an application. However, if the portion of the message received is not indicative of a malicious message or other problem, it is assumed that releasing this portion of the message to the application will not cause harm to the application.

The buffering capacity can be limited by using GAPAL statements to limit a maximum number of bytes that may be acceptably included in a message, as is described further below. For example, a limit for a uniform resource locator (URL) field of an HTTP message might be specified at a maximum of 2,000 bytes. By setting this buffer limit, excessive memory capacity need not be allocated for buffering. If a message is received that exceeds the limit, an exception will be triggered in the analysis engine.

A specification dispatcher 506 assigns an appropriate GAPAL specification to an application protocol layer instance 510. An application protocol layer instance 510 is established for each application for which protocol contexts will be analyzed, or for each portion of an application, and uses the appropriate GAPAL specification 508 developed for the purpose. As previously mentioned and as will be described further below, separate application protocol layer instances may be used to perform separate functions for a single protocol, such as by using one layer instance for datagram reordering and reassembly, and a second layer instance for substantive protocol analysis.

The specification dispatcher 506 identifies the appropriate GAPAL specification 508 using, if available, a process image name associated with the packet. Alternatively, the specification dispatcher 506 identifies the appropriate GAPAL specification 508 by a port number specified by the packet. The port number may be used to identify a particular session which, in turn, will be associated with a particular application, a particular protocol, and an appropriate GAPAL specification 508. The appropriate GAPAL specification 508 identified is used to perform message parsing for packets of the identified protocol throughout the protocol analysis process. An application protocol layer instance 510 for the identified protocol employs the message format and grammar provided by the appropriate GAPAL specification 508.

Figure 2:
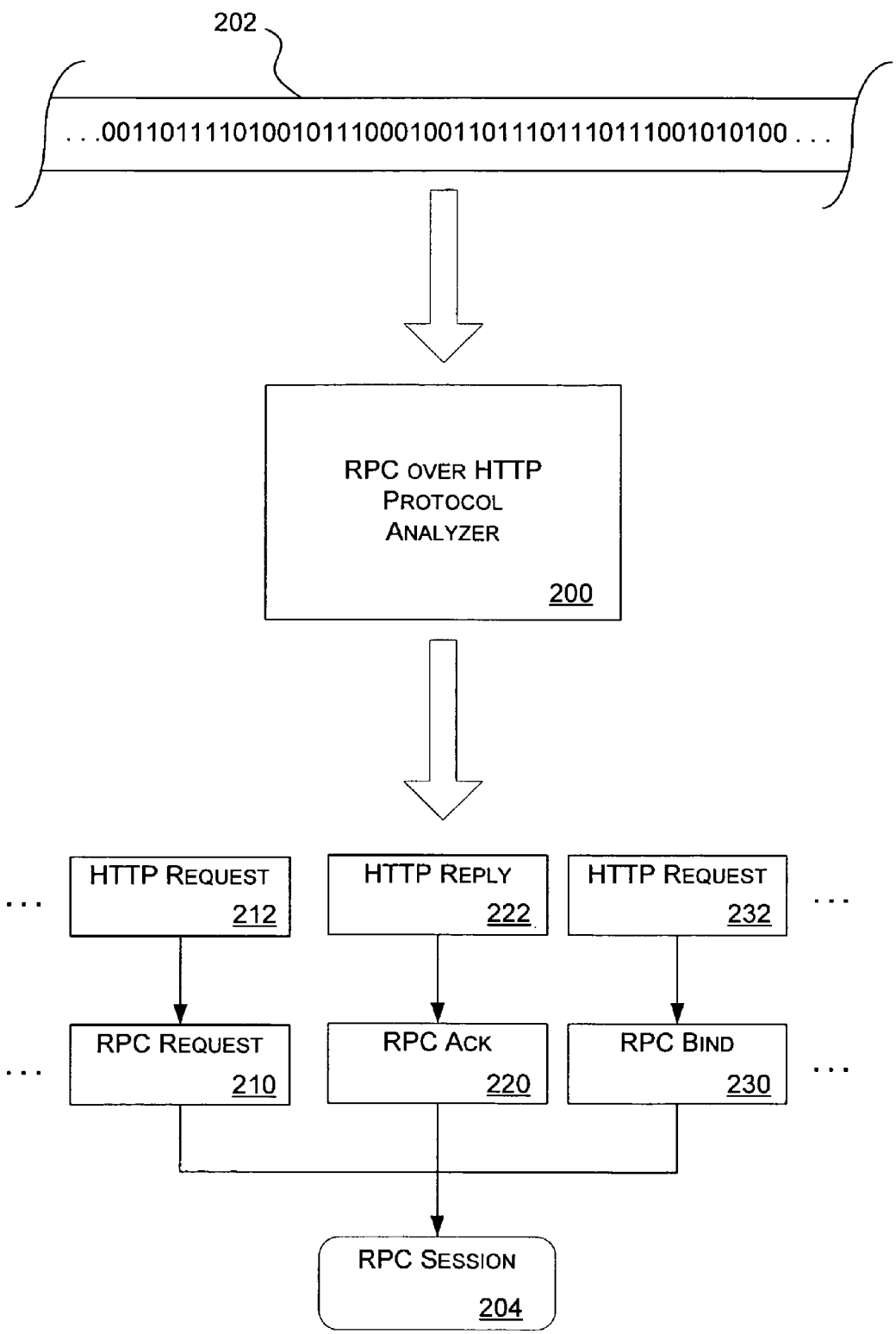
FIG. 2 (Prior Art) is a block diagram of a protocol analyzer for analyzing a protocol context involving multiple protocol layers.

Using multiple application protocol layer instances, such as application protocol instance 510, facilitates analysis of multiple, layered protocols. For example, as previously described in connection with FIG. 2, RPC can be layered over HTTP. Thus, for example, multiple application protocol layer instances allow both HTTP messages and RPC messages carried by them to be analyzed. Preferably, the messages for each protocol are analyzed separately. Thus, as is described further below, a lower layer protocol analyzer may analyze HTTP messages, and pass the embedded RPC messages to an upper layer where the content of the RPC the messages is analyzed. Each of the multiple application protocol layer instances maintain the session states at each layer to effect the layered communications between sessions initiated in each of the protocols.

Furthermore, in addition to employing separate application protocol layer instances for each of a number of protocols, separate layer instances may be employed for reassembling and reordering packets or datagrams, as well as analyzing the content of the packets. As is well understood in the art, units of data may be subdivided into independent packets or datagrams for transport over a network, and each of the datagrams may include their own routing or address information. The different datagrams may be sent over separate paths from a source to its destination, thus, it cannot be assumed that datagrams will be received in the same order in which they were transmitted. Application-level datagram tracking allows for reordering and reassembling of datagrams before the reassembled datagrams before the messages represented by the datagrams are analyzed. Thus, with multiple layer instances, a lower layer may be used for reordering and reassembling datagrams, while a higher layer is used to analyze the content of the datagrams.

Within the application protocol layer instance 510, a session dispatcher 512 directs the packet to a selected session 514 to which the packet is directed, as opposed to other sessions 516 that may be active. A session is an abstraction common to most protocols, and represents a connection established to execute a function between peers or between a client and a server. A session may be identified based the source and destination Internet Protocol (IP), based on the underlying transport connection, such as address and/or ports, or based on session identification included in a message. To model session dispatching, the protocol analysis engine tracks the currently active sessions so that messages can be associated with and dispatched to the appropriate session Once the session dispatcher 512 directs the packet to the selected session 514, a grammar parser 518 parses the message according to a message format specified in the appropriate GAPAL specification 508. Message parsing causes incoming messages to be evaluated according to a protocol-specific message format. Messages may be communicated using a number of packets. Accordingly, message parsing is performed incrementally, so that partial messages will be analyzed properly.

Figure 1:
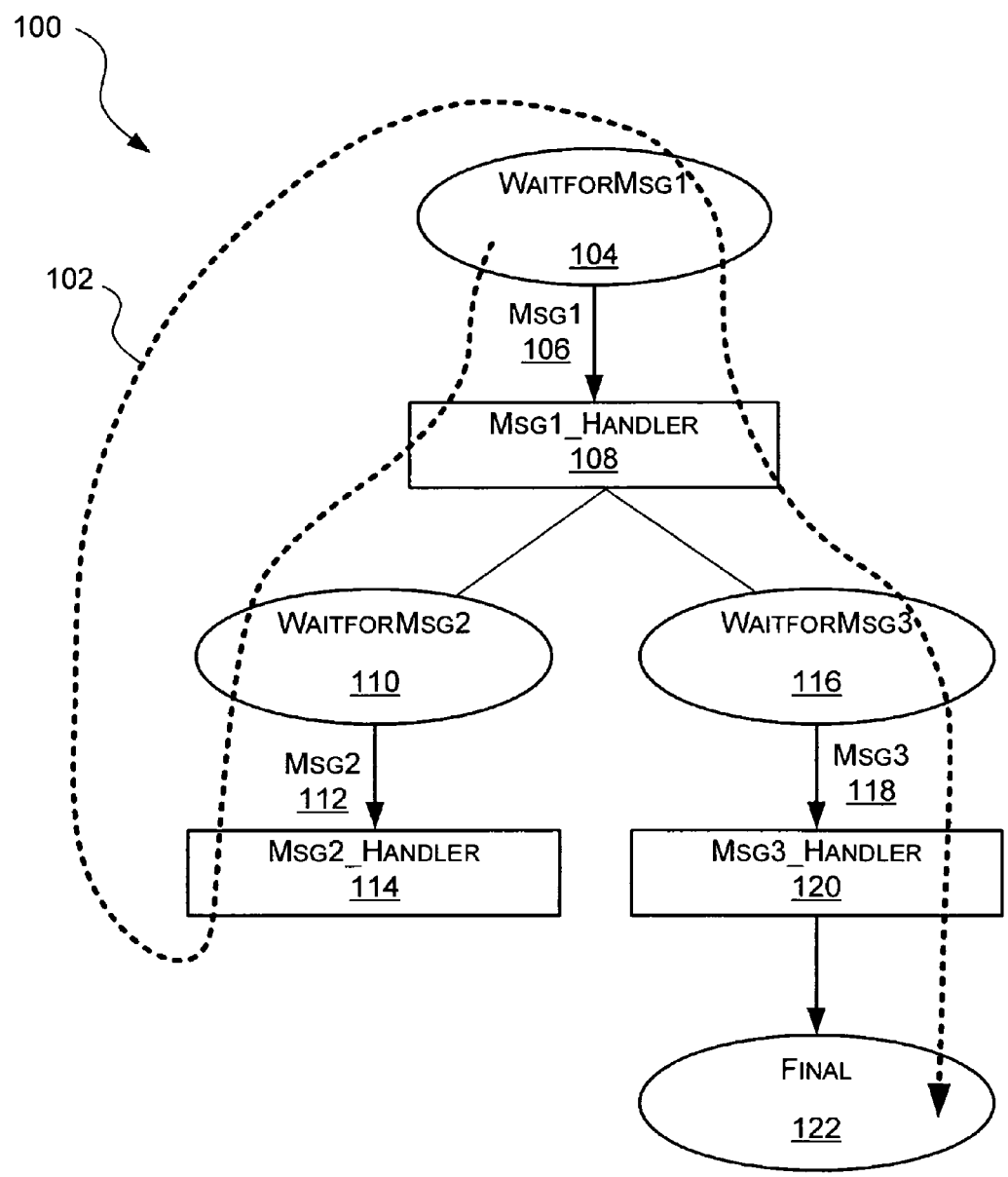
FIG. 1 (Prior Art) is a state machine diagram illustrating an exemplary protocol context.

After a message is parsed by the grammar parser 518, a state machine model 520 is used to determine the current state. The state machine model 520 is used to track the current state of the application based on occurrence of various events. Thus, as described in connection with FIG. 1, for example, once packets conveying messages are received and dispatched to the correct session, the state machine model 520 allows the protocol analyzer to determine what state change should result, if any, based on the message.

Based on the message and the current state, one or more handlers 522 are used to evaluate the substantive content or payload of the message and, as appropriate, transition the system to a next state. The handlers 522 may include timeout handlers and event handlers.

Timeout handlers allow for modeling timeout events as are recognized in many applications. For example, state machines often have timeout events for retries or for session state cleanup in the event of connectivity failures or remote host response failures. Unfortunately, it may be difficult to model timeout handling because it is difficult to maintain synchronization between the protocol analyzer and the application itself. As a result, a timeout may be reached in the protocol analyzer before the timeout has been reached in the application, or vice versa. Thus, embodiments of a protocol analyzer use outgoing message clocking to establish a workable relative time to be used in determining when a timeout has been reached to resolve the synchronization problem. Outbound message clocking is used to synchronize the analysis engine's current protocol state with the application's current protocol state.

Using outbound message clocking, it is assumed that an outgoing message, such as that generated by a firewalled host or a monitored entity in a trace or a sequence of outgoing messages reveals the current protocol state of the application. In an adversarial environment, for example, outbound messages are used because a malicious message may falsely represent its current state to attempt to circumvent protections employed by the receiving system. Understandably, it is also assumed that the application executing on the local system has not been compromised. It will be appreciated that, if the local system has been compromised, one cannot rely on the integrity of the analysis engine.

In one mode, the analysis engine 500 responds to two types of timeouts. A first type of timeout initiates a network event, such as a message retry event or a socket-closing event, which can be detected from the network directly by the analysis engine. Outgoing message clocking is used with network event timeouts, with the network event initiating a state change.

A second type of timeout is a network silent timeout, such as those resulting during session-cleanup. Because a network silent timeout does not generate a detectable, timeable event, the analysis engine 500 employs a timer to handle such events. A handler in the network analysis engine sets a timeout interval, and if no state transition occurs before the lapse of the interval, a timeout handler is invoked. The length of the interval can be set dynamically based on the protocol context.

To allow for timing inconsistencies between the GAPA and the application, at least in a normalizing mode operation, the analysis engine may set a conservatively short interval. A short interval may result in some timely packets being dropped, but would provide greater protection against malicious messages. Alternatively, the analysis engine may set a conservatively short interval. A short interval provides less protection in the event of a message that manages to exploit post-timeout handling of the application. However, extending the timeout interval may result in the analysis engine having assumed a state inconsistent with the late-arriving message. As a result, the message would be treated as an exception and, thus, should prove harmless to the application.

To address the competing advantages and disadvantages of setting conservatively long or short timeout intervals, an embodiment of an analysis engine uses ambiguous states, such as a "MaybeTimeout state." The analysis engine conservatively transitions to a MaybeTimeout state before the application timeout interval is reached. Once the analysis engine transitions to the MaybeTimeout state, outgoing message clocking is employed to infer the current protocol state of the application and synchronize with it. From the MaybeTimeout state, the system may transition to a timeout state or another state such that a timeout resulting from a synchronization discrepancy is disregarded.

Figure 6:
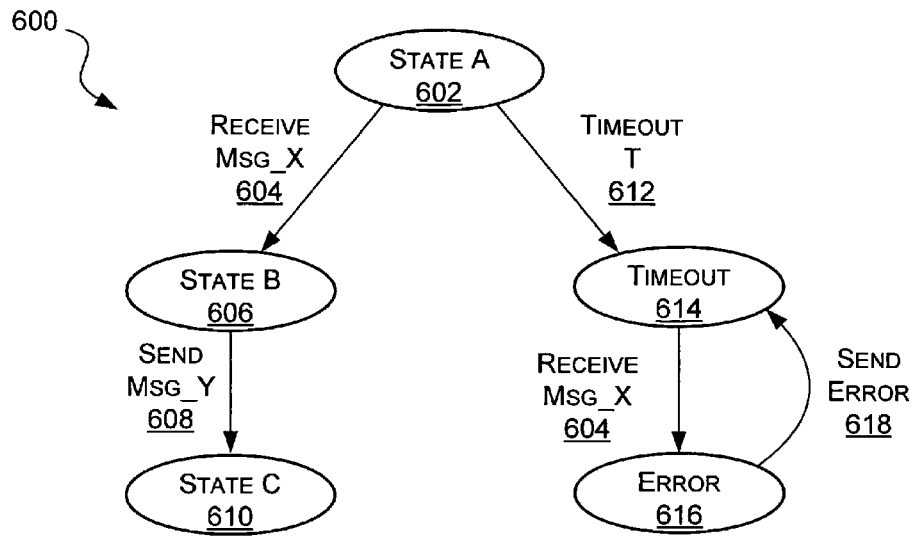
FIG. 6 (Prior Art) is a state machine diagram employing conventional state objects.
Figure 7:
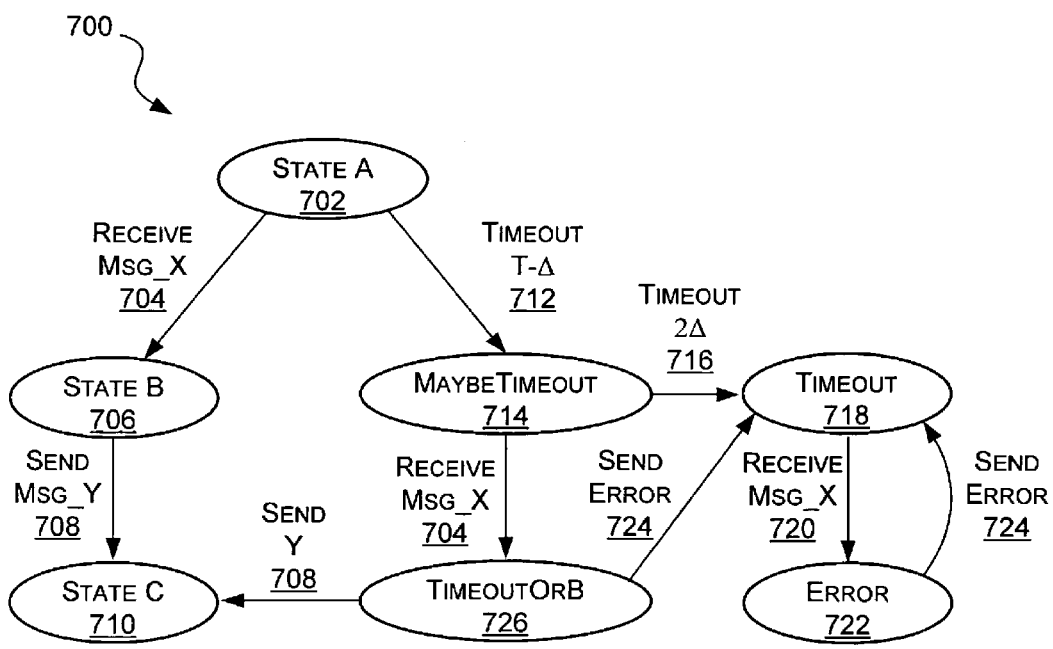
FIG. 7 is a state machine diagram including ambiguous state objects according to a mode of the GAPA.

FIGS. 6 and 7 illustrate operation of the ambiguous states. FIG. 6 shows a conventional state machine 600. The conventional state machine 600 begins with the system at State A 602. When the event of receiving Msg_X 604 occurs, the state of the system transitions from State A 602 to State B 606. Then, on the sending of Msg_Y 608, the state transitions from State B 606 to State C 610. However, while at State A 602, if an interval of Timeout T 612 is reached, the system transitions to Timeout state 614. While at Timeout state 614, if the event of receiving Msg_X occurs, the state machine transitions from the Timeout state 614 to Error state 616. Upon sending of error message 618, the system transitions back to Timeout state 614.

However, in the state machine 600, an interval of Timeout T 612 may be reached as a result of a synchronization error between the application and the protocol analyzer. The MaybeTimeout state provides an additional state to allow for synchronization errors to eliminate some false positive errors.

FIG. 7 represents an example of a state machine 700 using a MaybeTimeout state. The state machine 700 begins with the system at State A 702. As in the case of the conventional state machine 600 (FIG. 6), when the event of receiving Msg_X 704 occurs, the state of the system transitions from State A 702 to State B 706. Then, on the sending of Msg_Y 708, the state transitions from State B 706 to State C 710.

However, as opposed to conventional state machine 600 (FIG. 6), the state machine 700 (FIG. 7) does not transition to a timeout state 718 when interval of Timeout T 612 is reached. Instead, after an interval of Timeout T-$\Delta$ 712, the system transitions to a MaybeTimeout state 714. Symbol $\Delta$ represents an allowed synchronization error, thus T-$\Delta$ 712 represents a timeout interval less an allowed synchronization error. If the protocol analyzer is running on the same system as the analysis engine is running on same system as the application, the allowed synchronization error may be of a very brief duration amounting to a small fraction of a second. On the other hand, if the GAPA is implemented in a network setting, where the application runs on a system remote from the analysis engine, the allowed synchronization error may need to be as large as several seconds.

After an interval of Timeout T-$\Delta$ 712, the system is nearing reaching a timeout, thus the state transitions to the MaybeTimeout state 714. While in the MaybeTimeout state 714, after reaching an interval of Timeout 2$\Delta$ 716, the system transitions from MaybeTimeout state 714 to Timeout state 718. Thus, combining the interval of T-$\Delta$ 712 with 2$\Delta$ 716, the system transitions to Timeout state 718 only once a total interval of T+$\Delta$ has been reached, allowing a margin of $\Delta$ to allow for synchronization differences between the application and the protocol analyzer.

On the other hand, if the anticipated event of receiving Msg_X 704 occurs between intervals T-$\Delta$ 712 and T+$\Delta$ (not shown), the system will transition from MaybeTimeout state 714 to TimeoutOrB state 726, indicating that there remains some ambiguity as to a next state transition. From the TimeoutOrB state 726, whether the system transitions to State C 710 or Timeout state 718 depends on the next event, whether it is Send Msg_Y 708 or Send Error 724. The response from the application, however, should resolve this ambiguity, allowing the protocol analyzer to transition to the appropriate state. It may take more than one event or message to resolve any ambiguity resulting from a synchronization discrepancy, thus, additional ambiguous states may be appropriate to allow the protocol analyzer to accurately analyze the responses of the system.

As in the case of state machine 600 (FIG. 6), from the timeout state 718, if the event of receiving Msg_X 720 occurs, the state machine 700 transitions from the Timeout state 718 to Error state 722. Also as in the case of state machine 600, upon sending of error message 724, the system transitions back to Timeout state 718. Upon reaching either Timeout state 718 or Error state 722, there is no ambiguity and no need for ambiguous states. Thus, as appropriate, the GAPA makes use of both conventional state objects as well as ambigious state objects in order to facilitate protocol analysis.

It should be noted that ambiguous states used in handling timeouts may be performed by the GAPA transparently to the users, and users can be agnostic of the timeout handling used by the analysis engine. Users may create the GAPAL program according to the protocol state machine as described in available protocol specification documents, using timeout events for both network-observable and network-silent timeouts. Upon being compiled, the GAPA may impose ambiguous states for timeout handling, determining an appropriate allowed synchronization error based on user input or know system parameters.

For exception handling, when a message is parsed and determined not to be correctly formed, the length of a field exceeds a specified limit, or the message results in the handler generating an exception, an exception is generated by the analysis engine. Exceptions can be handled in a number of ways, such as by ignoring the error, dropping the packet, terminating the communication session, and informing a user of the error. In one mode, while exceptions raised by the handlers are not ignored, responses to parsing exceptions may be based on policy decisions made by a user in configuring the analysis engine with the GAPAL program, as described further below. As a matter of policy, for example, a user may determine that it is more important to be aggressive in defending against possible attacks or errors, or it may be more important to avoid disruptions in execution of the application. In aggressively defending against possible attacks, all potentially malicious or erroneous packets may be dropped, albeit potentially causing some disruption in the execution of the application.

In any case, after an exception is generated, the session transitions to an error state after an exception. All future packets for the session will also cause an exception and will be handled according to the same policy, effectively terminating the analysis of the session.

In addition to timeout handling, exception handling modeling permits the protocol analyzer to respond differently to different types of problems. For example, in parsing a message, the protocol analyzer may determine that the message was incorrectly formed and generate an exception. For other types of exceptions, such as errors found in the protocol layering or other errors may be detected by the analysis engine, the protocol analyzer may respond to the exceptions by raising alerts, dropping packets, terminating connections, or similar responses. Alternatively, the analysis engine may be directed to log the exceptions and continue, or to ignore the exceptions entirely. Thus, the protocol analyzer can be configured to respond differently to different types of exceptions. Thus, more serious exceptions, such as those indicating an attack on the system, may result in a connection being terminated, while lesser exceptions may be ignored or result in a user alert.

Referring again to FIG. 5, after operation of the grammar parser 518, the state machine model 520, and the handlers 522, the application protocol layer instance 510 then may dispatch the packet to a next layer instance 524. Use of separate layer instances as described further below is beneficial for both layered protocols as well as for distributing protocol context analysis functions for a single protocol, as described further below.

Embodiments of GAPA analysis engines are operable to perform speculative execution of messages to enhance efficiency of the analysis engine and reduce memory usage. More specifically, speculative execution causes the analysis engine to invoke handlers 522 as early as possible in the parsing process. In one mode, the analysis engine 500 will begin to execute handlers 522 as soon as even a single packet containing a particular message has been parsed by the grammar parser 518. The handler 522 will be executed until a component of the message that has not yet been received is referenced by the handler 522. When such a reference is encountered, a continuation for the rest of the handler is saved, pausing execution of the handler 522 until a packet containing the referenced component of the message is received. When that packet is received, execution of the handler 522 is resumed. This process continues until either until another unreferenced component is encountered or the handler completes its execution.

For example, when the analysis engine 500 is adapted for firewall and intrusion detection functions and uses speculative execution, as soon as a portion of a message is determined to include malicious content, a handler 522 is invoked to respond to the malicious message. Invoking the handler 522 without waiting for the entire message to be received yields two particular benefits: attacks are detected more quickly, and memory is not wasted in buffering a message that ultimately will be rejected.

Once the handler 522 completes execution, the analysis engine 500 can shift to a light parsing mode for the rest of the message that skips the parsing of fields of a length that can be determined in advance. Early execution is effective when the order in which fields are referenced by handlers 522 match the order they are parsed. A reference to a field that is received late in the message delays execution of the handler 522.

In a normalizing mode, speculative execution by the analysis engine 500 may result in a security hole because a partial message may be passed to an application only for the message to be later flagged as malicious as a result of a later-received field. In one mode, upon compilation of the GAPAL program, the user is warned of the possibility of partially passed but later flagged messages. By issuing such a warning, at least in simple cases where there are no data- or control-flow dependencies between statements, it may be possible to reorder code statements to avoid this problem. On the other hand, in complex cases where there are such data- or control-flow dependencies, a user receiving a warning may be encouraged to more aggressively block the early arriving field. Causing the analysis engine to block a message based on an early-arriving field may result in a false positive that a message is malicious. However, early flagging of such a field will not result in malicious messages being passed, having been determined to be a "false negative."

In another mode, speculative execution is also used by the session dispatcher 512. When a message is received, the session dispatcher 512 invokes session identifier logic, followed by execution of the appropriate handler 522. Control is passed from the session dispatcher 512 to the hander 522 automatically when enough of the message has been parsed for the dispatcher 512 to complete execution.

Because the analysis engine may receive packets containing incomplete messages, the analysis engine performs parsing incrementally, saving the parsing state currently reached between reception of each of the packets used to communicate the message. During this code parsing, the analysis engine 500 also executes code fragments to perform protocol analysis. As will be further detailed below in the description of the GAPAL, the code fragments executed will include those code fragments literally included in the message grammar as well as any "visitors" implicated by the particular traversal of one or more handlers based on the messages received. The resulting parse tree contains the components of the message parsed from the byte stream. Subsequently, the parse tree and other session states maintained by the code fragments are used by the parse tree to further evaluate the messages received.

If there is more than one protocol presented in messages communicated via the datastream 504, such as an RPC over HTTP layering as previously described, the content or payload of the message is then passed to a next layer instance 524. Although the next layer instance 524 is depicted as part of the selected session 514, the next layer instance 524 represents an additional application protocol layer instance like application protocol layer instance 510. Like the application protocol layer instance 510, the next layer instance 524 includes a session dispatcher, a grammar parser, a state machine model, a customization handler, and, possibly, an additional next layer instance if there is another protocol to be analyzed.

As previously described, using separate application protocol layer instances allows protocols to be specified by separate GAPAL programs, simplifying the protocol analyzer generation process. Operation of the protocol analyzer is also simplified. Instead of a single instance of a protocol engine analyzing multiple different protocols, a layer is dedicated to analysis of each protocol. For example, in an RPC-over-HTTP context, a lower layer may be configured to analyze HTTP messages and send the RPC content to a higher layer. The higher layer analyzes the RPC messages just as though the RPC messages are standalone RPC messages received in a single-layer protocol system. In separate layer instances, the analysis engines, including buffering, speculative execution, and other functions, operate independently to defend against malicious traffic and to avoid state-holding attacks received in either protocol.

Layering can be used not only to analyze separate, layered protocols, but can also be used to simplify the analysis of a complex protocol by separating analysis of different aspects of the complex protocol into component layers. For example, separate instances of analysis engines may be used to isolate the task of application-level fragmentation and datagram reordering. A lower layer may be configured to parse fragment headers. Using a specialized send call, such as a "sendFragment" call, the location of a current datagram in a fragment can be identified. Once the fragments are reassembled, the lower, fragment-header parsing layer passes the reassembled data to the upper layer. The upper layer can then perform other message parsing operations without having to reassemble the data.

Using an embodiment of an analysis engine in a normalizing mode, the analysis engine is used on the forwarding path, and the packets must be forwarded at the lowest layer of the engine. However, upper layers may still signal errors to the engine, which will cause the underlying packet to be dropped. Speculative execution at the lower layers will cause as much data to be passed to the upper layers as possible, while speculative execution at the upper layers will cause analysis to proceed as far forward as possible. It is assumed, that if the portion of the message received does not indicate malicious attacks or other problems and is passed to an upper layer, the portion forwarded will not cause harm to the upper layer of the application.

Operation of a GAPA

Figure 8:
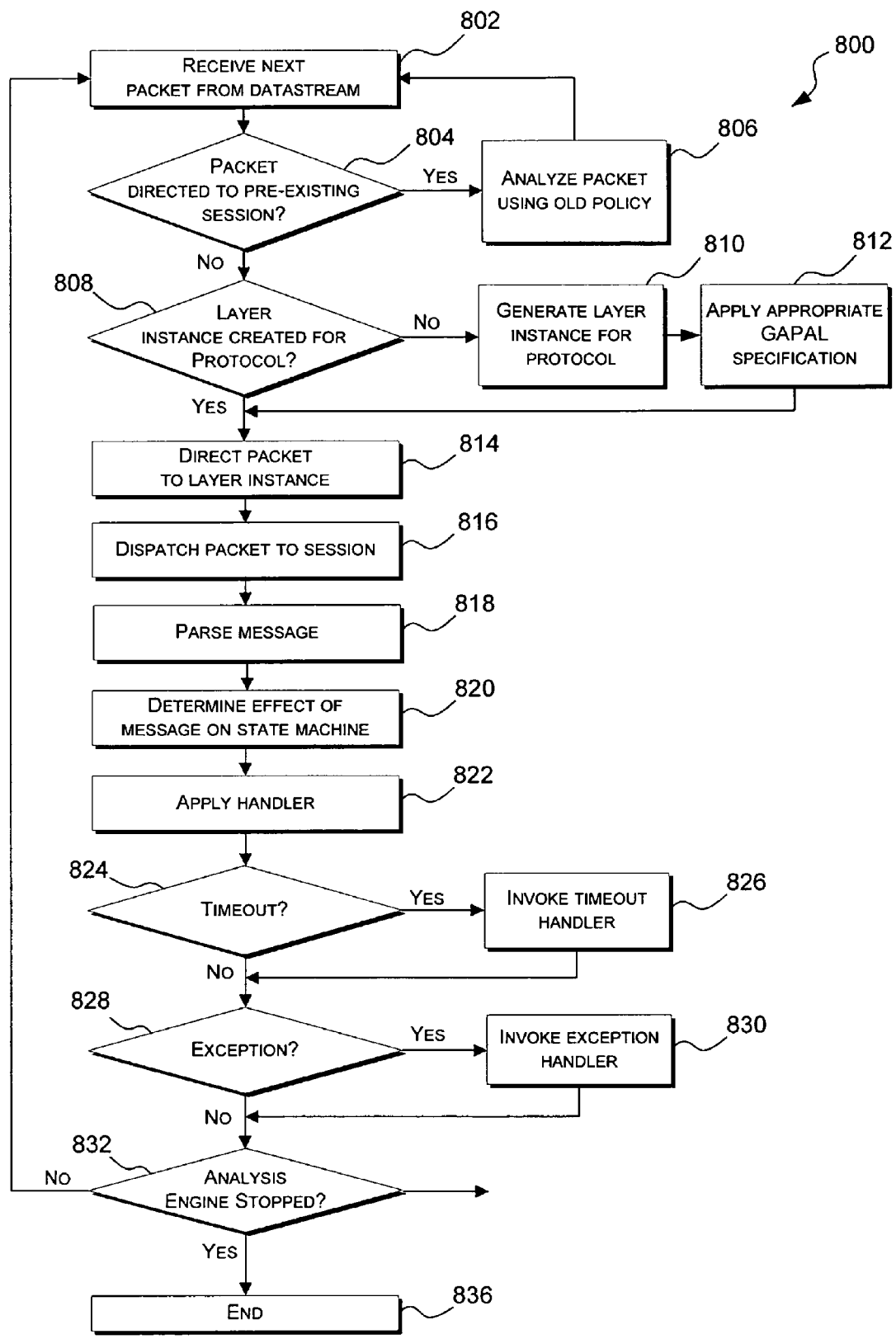
FIG. 8 is a flow diagram illustrating operation of an embodiment of a GAPA.

FIG. 8 is a flow diagram of a process 800 to further illustrate a mode of operation of a GAPA. At 802, a next packet is received from a datastream presenting the messages to be analyzed. At 804, because it is possible that a number of sessions have been opened by one or more applications before the GAPA analysis engine was initiated, it is determined if the packet is directed to such a pre-existing session.

In monitoring real-time data streams, pre-existing sessions may have been established before the analysis engine was activated to monitor a real-time datastream. When the analysis engine is used to analyze a trace, pre-existing sessions may have been established before the start of the portion of the trace that is being submitted for analysis. In either case, a message directed to a pre-existing session may be considered as a malformed message, leading to an exception being mistakenly generated exception and unnecessarily disrupting the pre-existing sessions.

To strike a balance between maintaining security and avoiding disturbing pre-existing sessions, an embodiment of GAPA observes a "grace period" for pre-existing sessions. During the grace period, messages directed to sessions not recognized by the analysis engine are not treated as exception. However, the messages are parsed, observed, and used to infer the current protocol state of the application. Outgoing message clocking is applied to infer the state of a pre-existing session. In a normalizing mode, a grace period permits a window during which a system may be subject to attacks. These periods of vulnerability can be eliminated by restarting applications once the analysis engine has been initiated.

In one mode, to identify whether a packet has been directed to a pre-existing session, a two-state identification process is used. First, old session identification is used to see if a message corresponds with an existing session. Second, if no such session exists, a session identification function is executed to analyze the message according to the parameters of the analysis engine.

If the packet is determined to have been directed to a pre-existing session, at 806, the packet is analyzed using an old policy, if any, that was previously implemented for protocol analysis. The packet or packets received are processed according to whatever policy or analysis was employed prior to initiation of the analysis engine. Recognizing the existence of pre-existing sessions and acknowledging old policies for analyzing messages directed to them minimizes possible disturbances to applications currently running when the GAPA analysis engine was initiated. Recognizing pre-existing sessions also minimizes potential false positive exceptions that would not have been generated if the analysis engine had operated continuously.

If it is determined that the packet is not directed to a pre-existing session at 804, thus indicating the packet is directed to current session, at 808, it is determined if a layer instance has yet been created for the protocol used in the packet. Thus, if not, for example, if the packet is a first packet received that is not directed to a pre-existing session, or if this is a first packet of a particular protocol, at 810, a layer instance is generated to handle packets of this protocol. At 812, an appropriate GAPAL specification is applied to direct analysis of packets of this protocol, as previously described in connection with FIG. 5.

If it is determined at 808 that a layer instance already has been generated for the protocol used by the packet, or once a layer is generated, the packet is processed as described in connection with FIG. 5. Thus, as discussed in connection with FIG. 5, at 814, the packet is directed to the appropriate layer instance for analyzing a packet of this protocol. At 816, the packet is dispatched to the target session. At 818, the portion of the message included in the packet is parsed. At 820, the state machine is accessed. At 822, the handler is applied to the packet.

In parsing the packet, determining the effect of the message in the packet on the state machine, and applying the handler based on the message, if it is determined at 824 that an event has resulted in a timeout, at 826, a timeout handler is invoked. Alternatively, at 828, if it is determined that an exception has been generated, at 830, an exception handler is invoked.

If it is determined that neither a timeout nor an exception has been determined, or after an appropriate handler has been invoked to respond to the event, at 832, it is determined if the analysis engine has been stopped. If not, the process loops to 802 to receive the next packet. On the other hand, if the analysis engine is stopped, at 834, the process 800 ends.

As previously described in connection with FIG. 5, the analysis is controlled by the GAPAL specifications. The GAPAL specifications are created using a GAPAL specification language described in the next section. Description of the GAPAL provides insight into the operation of the protocol analysis engine.

A Generic Application-Level Protocol Analyzer Specification Language

In one embodiment of a generic application-level protocol analyzer, a GAPAL is used to create a specification language program to direct the operation of the GAPA analysis engine. In one embodiment, to simplify understanding and use of the GAPAL, the GAPAL includes abstractions that can be used to represent each of the attributes of a protocol, with no additional abstractions. Thus, instead of a low-level programming language such as C, which includes commands and structures to perform virtually countless different functions, the GAPAL is reduced to a set of abstractions tailored for protocol analysis.

In one embodiment, to allow for message format specification for both binary and text-based protocols, a syntax similar to a Backus-Nauer Form (BNF) grammar is used. BNF grammars are useful for describing protocol specifications. However, unlike a conventional BNF grammar, the GAPAL is configured to direct parsing computations based on previous fields. Moreover, a visitor syntax is added that allows for access to message components embedded in the grammar. Protocol analysis-specific safety checks and optimizations also are suitably added.

Figure 9:
FIG. 9 is a list of exemplary GAPAL statements.

FIG. 9 presents a GAPAL program syntax 900. Most of the abstractions are enclosed by braces to clarify the separate modules included in a GAPAL program. The order in which the abstractions are listed in the GAPAL program 900 are not significant, and the modules can be used in any order in specifying attributes of the protocol being described. In the GAPAL program syntax 900, items in square brackets "[ ]" are optional, items in regular parentheses "( )" indicates that zero or more of the items are to be included, and items in parentheses marked with a plus sign "( )+" indicates that one or more of the items are to be included.

A protocol being modeled is identified with a protocol statement 902. The protocol statement specifies the name of the protocol, "protoName." A uses statement 904 indicates the next lower layer protocol from which a message payload may be piped to the protocol being specified. Thus, the uses statement 904 allows a user to specify each layer of a layered protocol to be specified in a separate GAPAL file, and the uses statement 904 can be used to coordinate the layers of the protocols that are being specified. An include statement 906 is a standard pre-processor directive. The include statement 906 specifies a name of an existing file that may be accessed by the GAPAL program. A transport statement 908 specifies the underlying transport protocols and port numbers used for base layer protocols.

A session-variables statement 910 is used to declare variables in the GAPAL. In one mode of a GAPAL program, there are four types of variables: message-local variables, session variables, handler-local variables, and local variables. Each of the variable types has a different lifetime and accessibility described below. The lifetime and accessibility of each type of variable is summarized in Table (1):

TABLE (1)

| Variable Type | Lifetime | Accessibility |
| --- | --- | --- |
| Message-local | Message | Entire GAPAL program |
| Session | Session | After session defined |
| Handler-local | Handler | Handler and visitor blocks |
| Local | Block | Block |

For variable declarations, base types include 8- to 32-bit integers signed and unsigned integers, uninterpreted bytes, floating point values, double-words, text strings, and Booleans. In one mode, safe arrays of base types are supported, although users are not permitted to manually allocate or free dynamic memory.

Session variables are used to track data across the lifetime of a session, spanning multiple messages. These variables are most commonly used in protocol analysis. Generally, the variables can be accessed by other code blocks in the GAPAL program. However, variables specified using variables statements 910 before a session has been identified by a session identifier statement 914, as further described below, are not accessible by the later defined session. Because the session instance has not yet been identified, allowing access to previously defined variables would be equivalent to allowing global variables. In one mode of a GAPAL system, global variables are not desirable because of the possibility of inadvertent corruption of the global variables, as is understood in the art.

A grammar statement 912 is used to define message-local variables used throughout the lifetime of parsing a message. A message, as previously described, may be presented over multiple packets. Because a message might be presented in multiple packets (that potentially are received in an order other than in which the message was sent), message-local variables can be accessed by the entire GAPAL program, including being accessible by code blocks that are executed before a session-identifier statement 916. Message-local variables defined by a grammar statement 912 are re-initialized for each message because the message-local variables are used in parsing each message received, thus it is not desirable to carry over values of a message-local variable between different messages.

The rest of the grammar statement 914 is used to specify the protocol message formats using BNF-like grammar rules. A "non-terminal" refers to either a message component or an entire message. A non-terminal roughly corresponds to a C structure or union type name for binary messages, and a BNF non-terminal for text-based messages. The production rule of a non-terminal indicates the composition of the non-terminal and can include alternation. Users can use a term "alt(<alternation name>)" to indicate the name of an alternation which is useful to visitors which, again, are explained in further detail below.

The <type> specified could be a base type, a token type, such as a regular expression, or another non-terminal. The type is used for typing the message components for type safety in expressions and statements, as well as for grouping bytes into type instances during parsing.

Users also can add the term <symbol> before the term <type> to refer to a parsed message field when needed. The term <maxBytes> allows users to indicate a maximum number of bytes permitted for a <symbol> <type>. Alternatively, although not shown in FIG. 9, users may specify a default upper bound size for all fields. A default upper bound size is applied at run-time of the GAPAL program. A default upper bound size will usefully restrict malicious payloads or other malformed or uncontrolled, "runaway" payloads.

The <code> term included in a grammar statement 912 is used to specify a grammar rule contain parsing-related logic. In one mode, at run-time of the GAPAL program, the analysis engine uses recursive descent parsing to parse an input byte stream according to the grammar specified. As in the case of typical recursive-descent parsers, left-recursion parsing is not permitted, as is described further below.

In addition to defining message-local variables, the grammar statement 912 is used to allow local variables to be defined within the GAPAL program blocks. Generally, local variables have a lifetime equivalent to that of the lifetime of the GAPAL program block, and thus are not accessible by other program blocks. An exception desirably is made for handler-local variables, which are defined by a handler statement 918, described further below. Handler-local variables remain accessible as long as the handler using the handler-local variable is being executed. Handler-local variables are described in more detail in the section below describing using visitor syntax with regard to handlers.

A state-machine statement 914 defines available states and their respective handlers. The state-machine statement also is used to indicate the initial and final state of a session. An IN term and an OUT term indicate whether an input byte stream is an incoming stream or an outgoing stream, respectively. Also, there is one handler per state per byte stream direction. A timeout transition also may be specified. A timeout transition can be activated by a handler.

A session-identifier statement 916 parses the byte stream according to the grammar rule identified by the <startNonTerminal> term. The session-identifier statement is used to extract and return a session identifier of an existing session. The session identifier is used by the analysis engine to dispatch the input byte stream to the correct session instance. A previously unseen identifier term may be used to create a new session instance. Each session instance will have its own copy of handlers, session state machine, and session variables.

In one mode, a session-identifier section of a GAPAL program, only message-local variables may be used. Session variables may not be used because session dispatching may not have finished running, and access to the session variables by the session-identifier section could corrupt the session variables.

A handler statement 918 is used to specify the customization logic the user intends for protocol analysis. In one mode, the handler statement 918 returns the next state for the current session. The next state is returned by the handler rather than being specified in state-machine, because the next state may be dependent both on the message content and the protocol analysis logic. Within handlers, assignment, conditional statements, common expression operators, and for/each type iterators are supported. A for/each-type iterator can be used to iterate through local safe arrays or grammar array elements of a message although, in one mode, only forward traversal of the arrays is permitted to prevent for/each-type iterators from resulting in infinite loops. Further, all statements and expressions are statically typed for safety. A variety of other built-in common functions preferably include byte order conversion routines, such as ntohs and ntohl functions, string routines, such as strlen and strtol functions, and other functions. In addition, to support analysis of layered protocols, a lower-layer protocol can invoke a send call to pipe data to the next higher protocol layer.

Special Functions Supported by a GAPAL Program

An analysis engine directed by a GAPAL program provides a range of capabilities, three of which are described in further detail below: message-parsing grammar, visitors in the handlers, and safety checks and optimizations.

First, an embodiment of a GAPAL includes a message parsing grammar operable to parse both binary and text-based messages. Both types of messages follow a similar recursive structure, thus, both types lend themselves to being represented by a BNF-type grammar. Text-based messages are generally presented in a grammar such as a BNF grammar or a similar grammar. Using a BNF-type grammar, where a BNF-type specification is available for the protocol to be analyzed, much of the message parsing grammar can be created by copying BNF notations from the protocol specification. Binary messages generally can be regarded as programming structures, such as C-based structs or unions, included within a datastream.

For illustration, FIG. 10 shows a GAPAL code fragment 1000 adapted for parsing HTTP code to illustrate operators recognized by the GAPAL code to facilitate parsing functions. As can be seen in the code fragment 1000, the C-like code sections, which may be familiar to a user of the GAPAL, may be included in the grammar to allow a user a familiar way to direct parsing operations. For example, permitting such structures may be useful for messages that use a length field to indicate the size of data to follow, as in the case of line 1002 that specifies the length of a body of an HTTP message using a header field "content length" 1004. The content length value 1004 is used at 1006 for performing a string comparison at line 1006 or conversion of the string to a base 10 numeral.

The GAPAL code fragment of FIG. 10 includes some operators specific to parsing functions provided by an embodiment of the GAPAL. It is desirable to be able to determine what types of symbols are included in messages to be parsed at runtime. The resolve operator, represented by the symbol ":=" as shown at line 1008, is used to allow statements to specify how to parse subsequent fields. Thus, the resolve operator assigns a type or a nonterminal specified on the right-hand side of the symbol ":=" to a symbol name given on the left-hand side of the symbol ":=". Thus, for example, at line 1008, "ChunkedBody" identifies a routine included in the code fragment that should be used to parse the message "body." The resolve operator is applied at line 1008 when a logical condition in preceding line 1010 determines if the body is determined to be "chunked." On the other hand, if it is determined at 1010 that the body is not chunked, according to the else term at subsequent line 1012, at line 1014, the resolve operator specifies that the "NormalBody" routine should be used to parse the message.

A dynamically-resolved symbol operator, represented by the symbol "?" 1016 represents a dynamically resolved symbol name. Thus, based on the lines of code from line 1010 and ending at line 1014, the dynamically-resolved symbol operator 1016 indicates that "body" will be resolved to be parsed either as a "ChunkedBody" or as a "NormalBody."

FIGS. 11 and 12 segments of a specification (FIG. 11) for analyzing RPC message with a GAPAL code segment (FIG. 12) defining how the message should be parsed in an embodiment of the GAPAL. More specifically, FIG. 11 represents an OpenGroup specification 1100 of an RPC bind message, and FIG. 12 represents a GAPAL code fragment 1200 for parsing the RPC bind message. Users of the GAPAL who are familiar with specification notation will be readily able to transfer the terms included in the specification 1100 into the syntax used in the GAPAL code fragment 1200. For example, in the specification 1100 at line 1102, the PTYPE variable is defined as an unsigned eight-bit with the expression "u_int8 PTYPE." In the GAPAL code fragment 1200, the PTYPE variable is defined at line 1202 with the expression "PTYPE: uint8." Thus, creating the message parsing code fragment allows for direct copying or simple translation of the specification terms.

However, in addition to using familiar programming symbols, the GAPAL fragment also includes the operators to define how the message is to be parsed. For example, in the rpcconn_bind_hdr_t routine at line 1204 of the code fragment 1200, based on the rpcconn_bind_hdr_t portion 1104 of specification, logical operators in lines 1204 and 1206, the resolve operator is used to select as an authentication verifier, "auth_verifier," either the auth_verifier_co_t routine at line 1208 or the null, emptyRule routine at line 1210, respectively. As in the example of FIG. 10, a dynamically-resolved symbol operator represented by the symbol "?" as included in line 1212 is used to signify that the auth_verifier to be used will be resolved within the GAPAL code fragment 1200.

To prevent unintended and/or undesirable uses of the resolution operator, one mode of a GAPAL checks to ensure that resolved symbols are not used in expressions resolve operator expressions. Because resolved symbols already have a determined type, it would be undesirable to allow a GAPAL code fragment to overwrite or otherwise determine the type of resolved symbols.

Using an embodiment of a GAPAL, it should be noted that code blocks can access message-local variables, session variables, and locally defined variables. As previously described, when using session variables, the message parsing is dependent on the session context.

The GAPAL provides operators to define the operation of handlers, as is described further below. Accordingly, users of the GAPAL desirably use grammar statements for parsing related logic, and to leave protocol analysis functions for the handler statements, described further below.

Second, visitors in the handlers allow for definitions of handlers to refer to fields of a message according to the recursive grammar. Both binary and text-based protocols may use deep recursion and/or alternation. Although dot notation, such as a:b:c may be useful in simple cases of recursion, dot notation is less useful in complex cases. To name one example, RPC may include up to eleven different alternations with each alternation including up to four levels. To evaluate an RPC message using alternation, one would explicitly have to check which case was used in the current message to avoid referring to fields that are not currently present. Using dot notation, the parsing logic in the grammar would practically have to be duplicated. Thus, using dot notation would be both tedious and error-prone.

However, in an embodiment of a GAPAL, repeating grammar and re-parsing may be replaced by allowing a user to create grammar "visitors." A visitor is a block of code that is executed each time a rule is visited. For example, in one embodiment of the GAPAL, the syntax of a visitor may be stated as:

@<non-terminal>(._alternation name>)?->{ . . . <code block> . . . }

In this example, the syntax assigns the non-terminal (or its alternation) a code block to run every time after the non-terminal (or the alternation) is parsed. Symbol names in the production of the non-terminal (or the alternation) can be accessed locally by the visitor. The code blocks represented by visitors thus work similarly to the blocks inserted into the grammar. However, creating the code block as a visitor enables a clean separation between the parsing logic and the protocol analysis, because the parsing logic need not be included or repeated in the code that performs the protocol analysis. In addition, the parsing logic manifested in the visitor can be invoked and reused by other code blocks performing different protocol analyses, also without having to include or repeat the code associated with the visitor.

The visitors in a handler represent the handler's customization of message parsing for the purpose of protocol analysis. Visitors are always executed before the rest of the handler code. Visitors can declare local variables, which exist only for the duration of each code block. For other, longer-lived variables, visitors can refer to handler-local variables, which have a lifetime corresponding to the handler execution. Thus, in one mode of a GAPAL, handler-local variables are initialized before any visitors so that they handler-local variables can be accessed by the visitors but, as previously described, the handler-local variables eliminated when the handler exits.

For a further example, the following is a simple visitor that counts the number of headers in an HTTP request for the grammar of FIG. 10:

```
handler hndl (HTTP Message) {
    int8 hdrcnt = 0;
    @General Header -> { hdrcnt++; };
    print("Total number of headers: %v\n", hdrcnt);
}
```

In the foregoing example, the visitor causes the term hdrcnt to be incremented each time the non-terminal "GeneralHeader" on line 1020 of the GAPAL program 1000 is traversed. The grammar rules symbols for the non-terminal "GeneralHeader" presented on line 1020 of the GAPAL program 1000 are locally available to the visitor. The term "hdrcnt" is a handler-local variable declared by the visitor. The term "hdrcnt" is initialized to zero every time "handler" is called. Every time "GeneralHeader" is traversed during parsing while "handler" is executing, hdrcnt is incremented. Because "hdrcnt" is a handler-local variable, even though it is declared by the visitor, once the entire message has been parsed, the total number of headers is printed by the "print" statement, and the variable "hdrcnt" is then eliminated.

Third, according to one embodiment, safety checks and optimizations are performed for GAPAL programs to ensure that the GAPAL programs are type-safe. Moreover, modes of GAPAL programs perform additional safety checks and optimizations.

The GAPAL employs dynamic safety checks. For example, the GAPAL may perform array bounds checking at runtime to avoid memory errors. In addition, integer math overflow and division by zero checking may be performed to avoid logical errors caused by unintended calculation mistakes.

In one mode, the GAPAL also detects unreachable grammar rules. A user may create a GAPAL program that includes one or more non-terminals that cannot possibly be reached during parsing based on logical structures. A GAPAL translator or compiler informs the user of the unreachable grammar so that the user will not rely on the protection of a rule that will never be applied.

An embodiment of the GAPAL also performs control flow analysis to ensure correct state machine use. In particular, control flow analysis determines that the execution of every handler both returns a state and that the returned state is defined in the state machine abstraction. Also, analogous to the unreachable grammar rules, the GAPAL translator also informs a user if there are one or more states described in the state machine abstractions that will never be reached as a result of the possible flow of control resulting from operation of the handlers.

Another embodiment of a GAPAL also applies resolution checking in connection with the previously described resolution operator. As previously described, as a result of conditional logic, resolution operators resolve grammar symbols to some specified non-terminal. Resolution checking ensures that each possible outcome of the conditional logic results in the grammar symbol being resolved to some non-terminal. In addition, expressions are checked to determine that they do not include resolved grammar symbols, because the resolution cannot of the grammar symbols only can be determined dynamically, not statically.

A mode of a GAPAL also ensures session identifier safety. Only message-local variables are permitted to be accessed in a session-identifier section. Further, code fragments that are executed during parsing may reference session variables, and will therefore result in an error if the code fragments referencing the session variables are executed before the session-identifier is activated. These types of run-time errors can be avoided by performing static analysis of which code blocks will be executed before the session dispatcher has completed its execution. Code blocks that invoke session variables before the session dispatcher completes execution are identified as possibly resulting in errors.

Further, another mode of a GAPAL performs termination assurance to ensure that parsing will reach an end, and will not result in infinite loops. To perform termination assurance, cycles in the grammar using standard techniques to find left recursion are identified. Generally, the GAPAL code blocks themselves will not result in infinite loops and, thus, are known to terminate. However, improper use of a resolution operator may create a parsing loop by combining grammar rules and code blocks. For example, the following code fragment results in the possibility of an infinite loop:

G->{s:=G;}s:?

In this code, each time G is traversed, s is resolved to invoke G, thus creating an infinite loop. A mode of a GAPAL detects this potential problem by examining code blocks to identify a list of all possible types to which a symbol may resolve. By applying a left-recursion check as understood in the art on those types, possible repeating self-resolutions are identified and flagged for the user.

Computing System for Implementing Exemplary Embodiments of a GAPA

Figure 13:
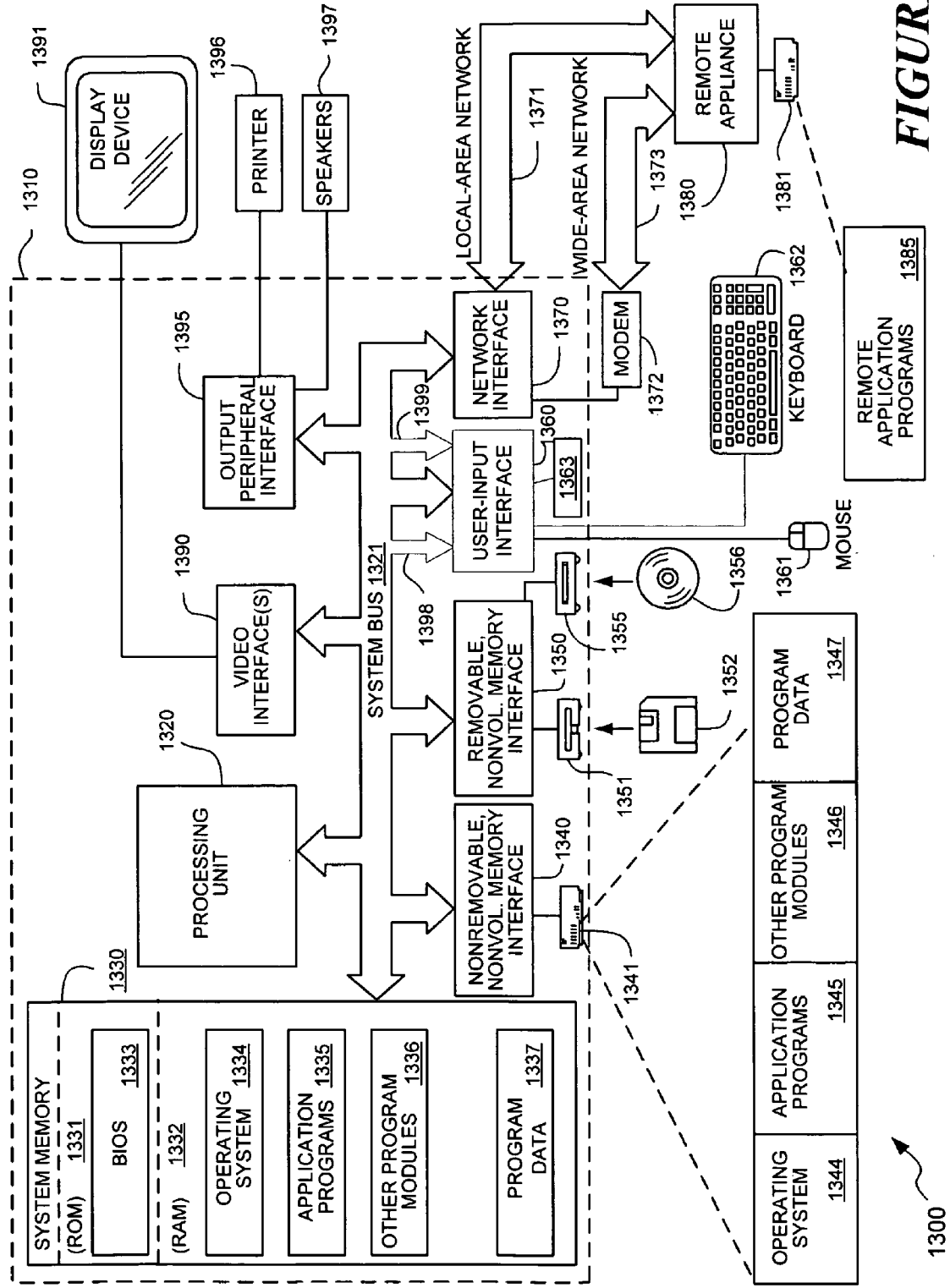
FIG. 13 is a functional diagram of a computing-system environment suitable for supporting a GAPA, including operation of an analysis engine and creation of GAPAL specification programs.

FIG. 13 illustrates an exemplary computing system 1300 for implementing embodiments of a GAPA, including performing protocol analysis and developing GAPAL programs to direct protocol analysis by the GAPA. The computing system 1300 is only one example of a suitable operating environment and is not intended to suggest any limitation as to the scope of use or functionality of exemplary embodiments of a GAPA. Neither should the computing system 1300 be interpreted as having any dependency or requirement relating to any one or combination of components illustrated in the exemplary computing system 1300.

A GAPA may be described in the general context of computer-executable instructions, such as program modules, being executed on computing system 1300. Generally, program modules include routines, programs, objects, components, data structures, etc., that perform particular tasks or implement particular abstract data types. Moreover, those skilled in the art will appreciate that the GAPA may be practiced with a variety of computer-system configurations, including hand-held devices, multiprocessor systems, microprocessor-based or programmable-consumer electronics, minicomputers, mainframe computers, and the like. A GAPA may also be practiced in distributed-computing environments where tasks are performed by remote-processing devices that are linked through a communications network. In a distributed-computing environment, program modules may be located in both local and remote computer-storage media including memory-storage devices.

With reference to FIG. 13, an exemplary computing system 1300 for implementing a GAPA includes a computer 1310 including a processing unit 1320, a system memory 1330, and a system bus 1321 that couples various system components including the system memory 1330 to the processing unit 1320.

Computer 1310 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 1310. The system memory 1330 includes computer-storage media in the form of volatile and/or nonvolatile memory such as ROM 1331 and RAM 1332. A Basic Input/Output System 1333 (BIOS), containing the basic routines that help to transfer information between elements within computer 1310 (such as during start-up) is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/nonremovable, volatile/nonvolatile computer-storage media. By way of example only, FIG. 13 illustrates a hard disk drive 1341 that reads from or writes to nonremovable, nonvolatile magnetic media, a magnetic disk drive 1351 that reads from or writes to a removable, nonvolatile magnetic disk 1352, and an optical-disc drive 1355 that reads from or writes to a removable, nonvolatile optical disc 1356 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 1341 is typically connected to the system bus 1321 through a nonremovable memory interface such as interface 1340. Magnetic disk drive 1351 and optical dick drive 1355 are typically connected to the system bus 1321 by a removable memory interface, such as interface 1350.

The drives and their associated computer-storage media discussed above and illustrated in FIG. 13 provide storage of computer-readable instructions, data structures, program modules and other data for computer 1310. For example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Typically, the operating system, application programs, and the like that are stored in RAM are portions of the corresponding systems, programs, or data read from hard disk drive 1341, the portions varying in size and scope depending on the functions desired. Operating system 1344, application programs 1345, other program modules 1346, and program data 1347 are given different numbers here to illustrate that, at a minimum, they can be different copies. A user may enter commands and information into the computer 1310 through input devices such as a keyboard 1362; pointing device 1361, commonly referred to as a mouse, trackball or touch pad; a wireless-input-reception component 1363; or a wireless source such as a remote control. Other input devices (not shown) may include a microphone, joystick, game pad, satellite dish, scanner, or the like. These and other input devices are often connected to the processing unit 1320 through a user-input interface 1360 that is coupled to the system bus 1321 but may be connected by other interface and bus structures, such as a parallel port, game port, IEEE 1394 port, or a universal serial bus (USB) 1398, or infrared (IR) bus 1399. As previously mentioned, input/output functions can be facilitated in a distributed manner via a communications network.

A display device 1391 is also connected to the system bus 1321 via an interface, such as a video interface 1390. Display device 1391 can be any device to display the output of computer 1310 not limited to a monitor, an LCD screen, a TFT screen, a flat-panel display, a conventional television, or screen projector. In addition to the display device 1391, computers may also include other peripheral output devices such as speakers 1397 and printer 1396, which may be connected through an output peripheral interface 1395.

The computer 1310 will operate in a networked environment using logical connections to one or more remote computers, such as a remote computer 1380. The remote computer 1380 may be a personal computer, and typically includes many or all of the elements described above relative to the computer 1310, although only a memory storage device 1381 has been illustrated in FIG. 13. The logical connections depicted in FIG. 13 include a local-area network (LAN) 1371 and a wide-area network (WAN) 1373 but may also include other networks, such as connections to a metropolitan-area network (MAN), intranet, or the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the network interface 1370, or other appropriate mechanism. Modem 1372 could be a cable modem, DSL modem, or other broadband device. In a networked environment, program modules depicted relative to the computer 1310, or portions thereof, may be stored in the remote memory storage device. By way of example, and not limitation, FIG. 13 illustrates remote application programs 1385 as residing on memory device 1381. It will be appreciated that the network connections shown are exemplary, and other means of establishing a communications link between the computers may be used.

Although many other internal components of the computer 1310 are not shown, those of ordinary skill in the art will appreciate that such components and the interconnections are well-known. For example, including various expansion cards such as television-tuner cards and network-interface cards within a computer 1310 is conventional. Accordingly, additional details concerning the internal construction of the computer 1310 need not be disclosed in describing exemplary embodiments of the key management process.

When the computer 1310 is turned on or reset, the BIOS 1333, which is stored in ROM 1331, instructs the processing unit 1320 to load the operating system, or necessary portion thereof, from the hard disk drive 1341 into the RAM 1332. Once the copied portion of the operating system, designated as operating system 1344, is loaded into RAM 1332, the processing unit 1320 executes the operating system code and causes the visual elements associated with the user interface of the operating system 1334 to be displayed on the display device 1391. Typically, when an application program 1345 is opened by a user, the program code and relevant data are read from the hard disk drive 1341 and the necessary portions are copied into RAM 1332, the copied portion represented herein by reference numeral 1335.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. A method for creating a protocol analyzer, comprising:
storing, in a memory communicatively coupled to a processor, computer-executable instructions for performing the method for creating the protocol analyzer;
executing the instructions on the processor;
according to the instructions being executed:
providing an analysis engine, the analysis engine including a plurality of objects adaptable to modeling response of an application to messages presented in a protocol, the analysis engine being is configured to allow speculative execution by a handler, which:
is invoked to begin processing a partial message when the partial message implicates the handler such that processing the partial message commences without waiting for completion of the partial message; and
is suspended when the handler references a portion of the partial message that is not yet available to the handler; and
receiving a series of messages, presented according to a protocol and in a data stream, to be at least one of supplied to and received from the application;
applying a specification program to the analysis engine, the specification program including instructions to adapt objects of the analysis engine to model a response of the application to the series of messages in the data stream;
the plurality of objects including a state machine object comprising:
a state machine timer; and
an ambiguous state responsive to the state machine timer and at least one outgoing message from the application, such that the analysis engine transitions to:
the ambiguous state when the state machine timer reaches a time within a synchronization margin of an application timeout interval;
a timeout state when the state machine timer reaches a time equal to the synchronization margin beyond the application timeout interval; and
a non-timeout state when the at least one outgoing message indicates the application has not reached the application timeout interval before the state machine timer reaches a time equal to the synchronization margin beyond the application timeout interval.

2. A method of claim 1, wherein the plurality of objects included in the analysis engine adaptable to modeling the response of an application include at least one of:
a session dispatching object;
a message parsing object;
a protocol layering object; and
a handler object including at least one of:
a timeout handling object;
an exception handling object; and
a pre-existing session handling object.

3. A method of claim 2, wherein the protocol layering object is adaptable to model the response of the application to at least one of:
messages in multiple protocols including:
a first layer object adapted to analyze a first message in a first protocol, the first message including a second message in a second protocol, and communicate the second message to a second layer object; and
the second layer object is adapted to analyze the second message in the second protocol; and
application-level datagrams such that a lower layer object performs at least one of reordering and reassembly of a datagram before delivering the datagram to an upper layer adapted to analyze content of the datagram.

4. A method of claim 1, wherein the synchronization engine is synchronized to the application using outgoing message clocking for network-observable timeouts, wherein the state machine infers the current state of the client from an outgoing message time.

5. A method of claim 1, further comprising submitting the message to the analysis engine including one of:
submitting the message in a normalizing mode wherein based on instructions in the analysis program, the analysis engine one of:
modifies the message before the message is passed to the application; and
prevents at least a portion of the message from reaching the application; and
submitting the message in an analysis mode the analysis engine identifies when the message transcends message parameters included in the analysis program.

6. A method of claim 1, further comprising creating the specification program using a protocol specification language recognizing statements corresponding to functions performable by the plurality of objects included in the analysis engine.

7. A computer-readable optical memory storage device having computer-useable instructions embodied thereon for executing the method of claim 1.

8. A system for performing protocol analysis for an application, comprising:
a processor;
a memory, containing instructions executed by the processor;

an analysis engine, defined at least in part on the memory and by operation of the processor, including a plurality of objects adaptable to model responses of the application to messages presented in a protocol, the plurality of objects including at least:
   a state machine object;
   a message parsing object; and
   a handler object;
   the analysis engine being configured to allow speculative execution of a handler based on the handler object, which:
     is invoked to begin processing a partial message when the partial message implicates the handler such that processing the partial message commences without waiting for completion of the message; and
     is suspended when the handler references a portion of the message that is not yet available to the handler;
   a datastream interface configured to receive a series of messages to be at least one of supplied to and received from the application; and
   a specification dispatcher configured to apply a specification program to the analysis engine, the specification program being configured to direct the objects of the analysis engine to model the responses of the application to the series of messages in the protocol included in the datastream;
   the state machine object further comprising:
     a state machine timer; and
     an ambiguous state responsive to the state machine timer and at least one outgoing message from the application, such that the analysis engine transitions to:
       the ambiguous state when the state machine timer reaches a time within a synchronization margin of an application timeout interval;
       a timeout state when the state machine timer reaches a time equal to the synchronization margin beyond the application timeout interval; and
       a non-timeout state when the at least one outgoing message indicates the application has not reached the application timeout interval before the state machine timer reaches a time equal to the synchronization margin beyond the application timeout interval.

9. A system of claim 8, wherein the analysis engine further comprises a protocol layering object adaptable to model the response of the application to at least one of:
   messages in multiple protocols including:
   a first layer object adapted to analyze a first message in a first protocol, the first message including a second message in a second protocol, and communicate the second message to a second layer object; and
   the second layer object is adapted to analyze the second message in the second protocol; and
   application-level datagrams such that a lower layer object performs at least one of reordering and reassembly of a datagram before delivering the datagram to an upper layer adapted to analyze content of the datagram.

10. A system of claim 8, wherein the handler object includes at least one of:
   a timeout handling object;
   an exception handling object; and
   a pre-existing session handling object.

11. A system of claim 8, wherein a handler based on the handler object:
   is invoked to begin processing a partial message when the partial message implicates the handler such that processing the partial message commences without waiting for completion of the message; and
   is suspended when the handler references a portion of the message that is not yet available to the handler.

12. A system of claim 8, wherein the analysis engine is synchronized to the application using outgoing message clocking for network-observable timeouts, wherein the state machine infers the current state of the client from an outgoing message time.

13. A system of claim 8, further comprising submitting the message to the analysis engine includes one of:
   submitting the message in a normalizing mode wherein based on instructions in the analysis program, the analysis engine one of:
   modifies the message before the message is passed to the application; and
   prevents at least a portion of the message from reaching the application; and
   submitting the message in an analysis mode the analysis engine identifies when the message transcends message parameters included in the analysis program.

14. A system for directing a protocol analysis engine for modeling responses of an application to messages in a protocol, comprising:
   a processor;
   a memory, containing instructions executed by the processor;
   an application specification language recognizing statements, contained within the memory, corresponding to functions performable by a plurality of objects included in the protocol analysis engine; a compiler for translating a set of instructions created using the statements in the application specification language into a specification program for controlling the protocol analysis engine;
   the protocol analysis engine being defined at least in part on the memory and by operation of the processor, and the plurality of objects including at least:
     a session dispatching object;
     a state machine object;
     a protocol layering object;
     a message parsing object; and
     a handler object;
   the protocol analysis engine being configured to allow speculative execution of a handler based on the handler object, which:
     is invoked to begin processing a partial message when the partial message implicates the handler such that processing the partial message commences without waiting for completion of the message; and
     is suspended when the handler references a portion of the message that is not yet available to the handler; and
   the plurality of objects, being included in the protocol analysis engine, being adaptable to modeling the response of an application, and comprising:
     a handler object comprising:
       a timeout handling object;
       an exception handling object; and
       a pre-existing session handling object;
   a data stream interface configured to receive a series of messages to be at least one of supplied to and received from the application; and
   a specification dispatcher configured to apply a specification program to the protocol analysis engine, the specification program being configured to direct the objects of the protocol analysis engine to model the responses of the application to the series of messages in the protocol included in the data stream;

the state machine object including:
  a state machine timer; and
  an ambiguous state responsive to the state machine timer and at least one outgoing message from the application, such that the analysis engine transitions to:
    the ambiguous state when the state machine timer reaches a time within a synchronization margin of an application timeout interval;
    a timeout state when the state machine timer reaches a time equal to the synchronization margin beyond the application timeout interval; and
    a non-timeout state when the at least one outgoing message indicates the application has not reached the application timeout interval before the state machine timer reaches a time equal to the synchronization margin beyond the application timeout interval.

15. A system of claim 14, wherein the statements recognized by the protocol specification language include parameters adapted for analysis of:

at least one binary protocol; and
at least one text-based protocol.

16. A system of claim 14, wherein the protocol specification language includes a visitor syntax assigning a set of instructions to be executed each time a specified non-terminal object or an alternation of the specified non-terminal object is parsed.

17. A system of claim 14, wherein the visitor syntax is configured to access variables within a code block including the specified non-terminal object or the alternation of the specified non-terminal object.

18. A computer-readable magnetic disk storage device having computer-useable instructions embodied thereon for executing the method of claim 1.

19. A computer-readable random access memory storage device having computer-useable instructions embodied thereon for executing the method of claim 1.

20. A computer-readable read only memory storage device having computer-useable instructions embodied thereon for executing the method of claim 1.

* * * * *